US012700521B1

(12) United States Patent
Blink

(10) Patent No.: US 12,700,521 B1
(45) Date of Patent: Aug. 4, 2026

(54) SYSTEM AND METHOD OF WHITENING USED GOLF BALLS VIA ARTIFICIAL LIGHT

(71) Applicant: Acushnet Company, Fairhaven, MA (US)

(72) Inventor: Robert Blink, Newport, RI (US)

(73) Assignee: Acushnet Company, Fairhaven, MA (US)

( * ) Notice: Subject to any disclaimer, the term of this patent is extended or adjusted under 35 U.S.C. 154(b) by 597 days.

(21) Appl. No.: 18/222,004

(22) Filed: Jul. 14, 2023

(51) Int. Cl.

| | |
|---|---|
| ***G21K 5/02*** | (2006.01) |
| ***A63B 47/04*** | (2006.01) |
| ***A63B 102/32*** | (2015.01) |
| ***H01J 61/02*** | (2006.01) |
| ***H01J 61/16*** | (2006.01) |

(52) U.S. Cl.
CPC ................ *G21K 5/02* (2013.01); *A63B 47/04* (2013.01); *A63B 2102/32* (2015.10); *H01J 61/025* (2013.01); *H01J 61/16* (2013.01)

(58) Field of Classification Search
CPC ...... G21K 5/02; A63B 47/04; A63B 2102/32; H01J 61/025; H01J 61/16
USPC ..................................................... 250/455.11
See application file for complete search history.

(56) References Cited

U.S. PATENT DOCUMENTS 6,245,386 B1 * 6/2001 Felker ................ A63B 37/0022 427/407.1
6,389,639 B1 * 5/2002 Worsham ............... A63B 47/04 15/21.2
6,995,191 B2 2/2006 Sullivan et al.
8,109,843 B2 2/2012 Hebert et al.
8,663,512 B2 * 3/2014 Lin .................... A63B 37/0031 264/36.12
8,834,297 B2 9/2014 Sullivan et al.
9,364,719 B2 6/2016 Sullivan et al.
9,939,291 B2 4/2018 Sullivan et al.

OTHER PUBLICATIONS

"Specification Bulletin LX-5046-Q-SUN Xenon Test Chambers" (Copyright 2023) (2 pages).
"Technical Bulletin LX-5023 Lightfastness Studies of Water-based Inkjet Inks on Coated and Uncoated Papers" Tobias et al. (Copyright 2011) (8 pages).
"Q-SUN Xenon Test Chambers" (Copyright 2022) (16 pages).

* cited by examiner

*Primary Examiner* — Michael Maskell
(74) *Attorney, Agent, or Firm* — Thomas P. Gushue

(57) ABSTRACT

An artificial light whitening treatment for golf balls is disclosed herein. The whitening treatment can be used for golf balls recovered from water hazards, in one aspect. The whitening treatment can be an artificial light treatment comprised of a xenon arc lamp, in one example. The treatment can be configured to whiten golf balls while avoiding using known synthetic chemical based whitening techniques or solutions.

18 Claims, 3 Drawing Sheets

SYSTEM AND METHOD OF WHITENING USED GOLF BALLS VIA ARTIFICIAL LIGHT

FIELD OF THE INVENTION

This disclosure generally relates to a system and method for whitening golf balls, and more particularly relates to whitening used golf balls via artificial light.

BACKGROUND OF THE INVENTION

There is an increasing drive to provide improved treatment processes for used golf balls in order to recondition the golf balls, which is driven in part by price conscious customers as well as ecological demands to reduce waste via recycling golf balls.

Some known solutions for whitening golf balls include synthetic chemical based whitening methods and agents. Some reconditioning and whitening processes result in alteration of the structure of the materials used in the golf ball.

It would be desirable to provide a golf ball whitening solution that yields reliable results in a controlled setting, does not require chemical based whitening agents or techniques, and also preserves the original profile of the golf ball.

SUMMARY OF THE INVENTION

In one aspect, the present disclosure is directed to a method of whitening a golf ball recovered from a water hazard. The method comprises applying an artificial light treatment to the golf ball for a treatment period such that the golf ball is whitened. The specific characteristics of the artificial light treatment and the treatment period can be optimized to maximize the whitening effect while also protecting underlying layers and/or structure of the golf ball.

The golf ball recovered from the water hazard can have a cover formed from ionomer, polyurethane, polyurea, or hybrid of polyurethane-polyurea. The golf ball can have at least one paint layer disposed on the cover. In some examples, the golf ball can have a first and second paint layer disposed on the cover, or a first, second, and third paint layer disposed on the cover. One or more of the paint layers can include white paint. One or more of the paint layers can include a clear coating.

In one aspect, the treatment period is at least five hours. The treatment period can be no greater than 80 hours in another example. In other aspects, the treatment period can be less than five hours or greater than 80 hours. One of ordinary skill in the art would understand that whitening results could be realized under one hour.

The artificial light treatment can include a xenon arc lamp, in one example. Other types of artificial light or electric light can be used, as one of ordinary skill in the art would appreciate based on the present disclosure.

The artificial light treatment can be configured to emit light and radiation at a wavelength range, which can be at least 250 nanometers-800 nanometers, in one example. The artificial light treatment can be configured to emit light and radiation at a wavelength range, which can be at least 300 nanometers, in one example. The wavelength range can be 100 nanometers-3,500 nanometers, in another example. The artificial light treatment can be configured to emit light within a wavelength range that includes at least a subset of wavelengths between 300 nanometers −2,500 nanometers. As one of ordinary skill in the art would appreciate, the wavelength range can be dependent upon the source of the artificial light, as well as any light filters that are applied.

An irradiance range of the artificial light treatment can be set at 0.60 $W/m^2/nm$-0.85 $W/m^2/nm$ as measured at 340 nanometers. The irradiance range can be at least 0.50 $W/m^2/nm$ at 340 nanometers. An irradiance range of the artificial light treatment can be set at 0.25 $W/m^2/nm$-1.50 $W/m^2/nm$ as measured at 320 nanometers, or 340 nanometers, or 360 nanometers, or 380 nanometers, or 400 nanometers, or 420 nanometers, or 440 nanometers, or 460 nanometers. The irradiance range can vary.

The artificial light treatment can be configured to be applied to an entire outer surface of the golf ball. Various racks, support assemblies, holders, and other features can be configured to provide motion of the golf ball relative to a source of the artificial light treatment. The artificial light treatment can be applied in an enclosed chamber, in one example. In this manner, the artificial light treatment is controlled and regulated.

The golf ball can be whitened from an initial state to a final state, such that an L*-axis value of the CIELAB color space increases by at least 1 unit. In one example, the golf ball is whitened from an initial state to a final state, such that a b*-axis value of the CIELAB color space shifts towards a value of 0 on the b*-axis by at least 2 units. The golf ball can be whitened from an initial state to a final state such that a ΔE* value of the CIELAB color space shows a color change or shift (i.e., overall whiteness improves or shifts towards white in the CIELAB color space) by at least 2 units, or at least 4 units, or at least 6 units, or at least 8 units, or at least 10 units from initial values.

The golf ball can be lightened or whitened from an initial state to a final state, such that an L*-axis value of the CIELAB color space increases by at least 1 unit. In one example, the golf ball color is shifted from an initial state to a final state, such that a b*-axis value of the CIELAB color space shifts towards a lower value on the b*-axis by at least 2 units. The golf ball color can be shifted from an initial state to a final state such that a ΔEcmc or ΔE* value of the CIELAB color space shows a color change or shift by at least 2 units, or at least 4 units, or at least 6 units, or at least 8 units, or at least 10 units from initial values.

The method can further comprise applying a debris-removal treatment to the golf ball prior to applying the artificial light treatment. This debris-removal process can include washing techniques including spraying with a fluid, such as water or soap, and wiping or scrubbing the golf balls.

Another exemplary method of whitening a golf ball recovered from a water hazard is also disclosed. The method includes applying an artificial light treatment at an irradiance to the golf ball for a treatment period such that the golf ball is whitened. The artificial light treatment can have an irradiance range of 0.25 $W/m^2/nm$-1.50 $W/m^2/nm$ at 320 nanometers, or 340 nanometers, or 360 nanometers, or 380 nanometers, or 400 nanometers, or 420 nanometers, or 440 nanometers, or 460 nanometers. The treatment period can be at least one hour, in one example. The golf ball can have a cover formed from ionomer, polyurethane, polyurea, or hybrid of polyurethane-polyurea. One of ordinary skill in the art would understand that other materials can be used to form the cover. The golf ball can be whitened from an initial state to a final state, such that: an L*-axis value of the CIELAB color space increases by at least 1 unit, and a b*-axis value of the CIELAB color space shifts by at least 2 units towards a value of 0 on the b*-axis.

Various other aspects and features of the whitening process are further disclosed herein.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
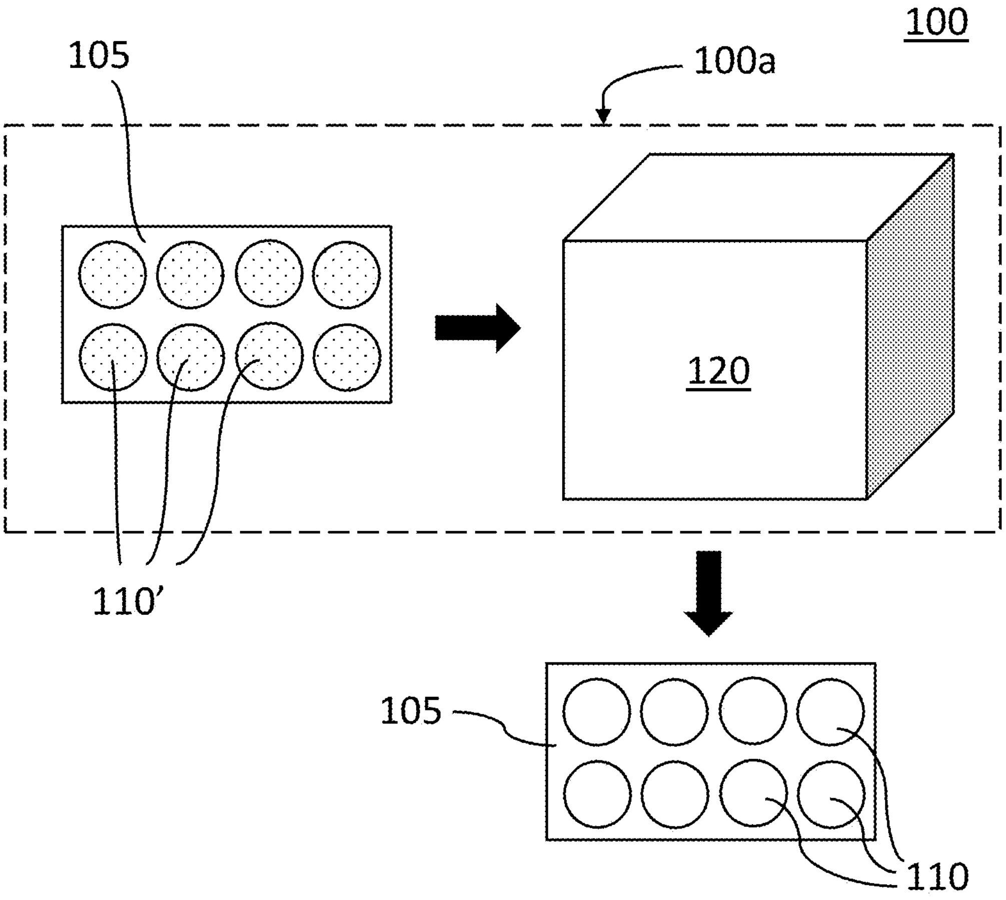
FIG. 1 is an exemplary flow diagram of a whitening configuration according to a first aspect.

In one aspect, a method of whitening a golf ball is disclosed herein. In a specific aspect, a method of whitening a used golf ball (hereinafter generally referred to as "the golf ball") recovered from a water hazard is disclosed herein. The whitening method can be applied to a single golf ball or a batch of golf balls. The golf ball can be recovered from a water hazard, such as a pond, creek, etc. In one aspect, the golf ball has been at least partially submerged in a water hazard for at least one hour. In one aspect, the golf ball has been at least partially submerged in a water hazard for at least one day. In one aspect, the golf ball has been at least partially submerged in a water hazard for at least one week, at least one month or a few months, at least one year or a few years, etc. In some aspects, the golf ball can be fully submerged within a water hazard.

The golf balls in the water hazard can be exposed to biological and chemical conditions due to being submerged and/or partially embedded within soil. The golf ball recovered from the water hazard can have undergone some degree of discoloration, in one aspect. For example, the recovered golf ball can be discolored such that a ΔE* value of the CIELAB color space shows a color shift of at least 1.0 unit when compared to a new golf ball that was not in a water hazard. In one aspect, the water hazard can cause discoloration such that a magnitude of the color shift produces a ΔE* value of at least 5.0 units when compared to a new golf ball that was not in a water hazard. In one aspect, the recovered golf ball can have a yellow, grey, dingy, or otherwise discolored appearance. In one aspect, the present disclosure is specifically configured to produce a whitening effect for non-new or used golf balls. In one aspect, the golf balls can otherwise be exposed to environmental conditions that cause discoloration from an original white color, and does not have to include golf balls that have been submerged in water hazards. For example, the golf balls can be recovered from being disposed in biological matter, such as mud, puddles, wet or damp underbrush, or other conditions typically found on a golf course. In one aspect, the process, method, system, and other features disclosed herein can generally be applied to used golf balls that have experienced discoloration that was primarily caused due to intake of chemicals, molecules, biological matter, or other non-solar originating impetus.

The method can include applying an artificial light treatment at a wavelength range and an irradiance range to the golf ball for a treatment period such that the golf ball is whitened. As used in this context, the term artificial light treatment can refer to a whitening treatment that does not rely on the natural light emitted by the sun. Based on this aspect, the artificial light treatment is controlled and regulated, thereby providing a reproducible and reliable whitening technique. In one aspect, the artificial light treatment is supplied at a predefined wavelength range, a predefined irradiance range, and a predefined treatment period. Other parameters or variables of the artificial light treatment can also be predefined. As used in one context, the whitening technique produces reliable whitening results for similarly situated golf balls (i.e., golf balls having a similar starting/new condition and golf balls generally discolored under similar conditions). The controlled artificial light treatment can be configured to maintain a constant irradiance, in one example. The artificial light treatment can be generally configured to mimic natural sunlight, i.e., mimic the wavelength profile, irradiance, and other characteristics of natural sunlight at the earth's surface. One of ordinary skill in the art would understand that various artificial light treatments have various inherent wavelength profiles, and various irradiance values can be used to apply the whitening treatment to the golf ball.

In one aspect, the artificial light treatment can be a full spectrum light treatment. In one aspect, the artificial light treatment comprises ultraviolet A radiation, ultraviolet B radiation, and ultraviolet C radiation. In one aspect, the artificial light treatment comprises the ultraviolet (A, B, C), visible light, and infrared portions of the electromagnetic spectrum. One of ordinary skill in the art would understand that other types of light or radiation can be used. In one aspect, ultraviolet A and B radiation can be applied to the golf ball. In another aspect, ultraviolet B and C radiation can be applied to the golf ball. One of ordinary skill in the art would understand that any one or more of the ultraviolet A, B, C radiation spectrums, as well as visible light and infrared radiation can be used individually or in combination with each other. In one aspect, visible light is used. Visible light, which is not as energetic as ultraviolet light, can be less damaging to the underlying structural molecules of the golf ball and result in a more controlled and limited degradation of the golf ball during the artificial light treatment.

In one specific example, the present disclosure relies on light irradiance whitening, and does not require application of any synthetic whitening substances (i.e., chemicals, agents, fluids) to a surface of the golf ball. As used in this context, the term synthetic whitening substance does not include ambient oxygen (which is inherently present in the present configuration) or water (which can be optionally sprayed in the present configuration), and instead refers to known synthetic, industrial, or manufactured chemical whitening chemicals, agents, or fluids, which can include peroxide, ammonia, bleach, etc. This list is non-exhaustive and provided for illustrative purposes only.

In one aspect, the golf ball has a cover formed from polyurethane, polyurea, or hybrid of polyurethane-polyurea. In another aspect, the golf ball has a cover formed from an ionomer. One of ordinary skill in the art would understand that the present disclosure can be used on golf balls having varying constructions and types of covers. For example, U.S. Pat. Nos. 6,995,191, 8,109,843, 8,834,297, 9,364,719, and 9,939,291 are each incorporated by reference in their entirety as if fully set forth herein, and each disclose various golf ball constructions. In one example, the golf balls recovered from the water hazard and suitable for the whitening treatment disclosed herein have one layer, two layers, three layers, four layers, five layers, or more than five layers.

In one example, the cores of the golf balls can be formed from a base rubber. The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

In one example, intermediate layers of the golf balls can be formed from ionomer resins, highly neutralized polymers, polybutadiene, butyl rubber, and other rubber-based core formulations, and the like. In one embodiment, an inner core layer, i.e., the layer disposed between a core assemblage and an outer cover, includes an ionomer. In this aspect, ionomers suitable for use in accordance with the present disclosure may include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers.

In one example, covers of the golf balls can be formed from polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; cross-linked trans-polyisoprene and blends thereof; polyester-based thermoplastic elastomers; polyurethane-based thermoplastic elastomers; synthetic or natural vulcanized rubber; and combinations thereof.

In one example, the golf balls have inner and outer covers, inner and outer intermediate layers, and/or inner and outer core layers. Other exemplary golf ball constructions are disclosed in U.S. patents application Ser. Nos. 18/105,267 (filed on Feb. 3, 2023) and Ser. No. 18/105,269 (filed on Feb. 3, 2023), which are both commonly assigned to Acushnet Company and which both are incorporated by reference in their entirety as if fully set forth herein.

The golf ball can have at least one paint layer disposed on the cover. In one specific construction, a first and second paint layer can be applied or deposited on the golf ball cover. In another aspect, a first, second, and third paint layer can be applied or deposited on the golf ball cover. In one configuration, the first paint layer (i.e., innermost paint layer) directly contacts the cover and is comprised of white paint, the second paint layer (i.e., medial paint layer) directly contacts the first paint layer and is comprised of white paint, and the third paint layer (i.e., outermost paint layer) directly contacts the second paint layer and is comprised of a clear coating. One of ordinary skill in the art would understand that other types of paint or coatings can be used.

Figure 3:
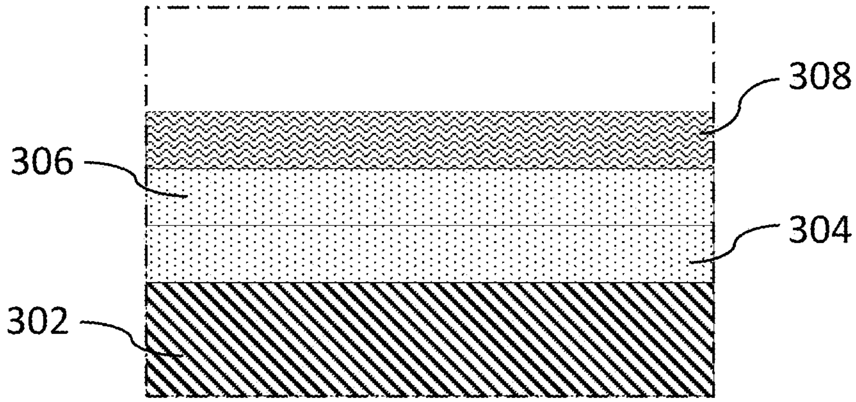
FIG. 3 is a cross-sectional view of a portion of an exemplary golf ball.

An exemplary golf ball cover construction is shown in FIG. 3. As shown in FIG. 3, the golf ball can include a cover layer 302, a first paint layer 304 directly in contact with the cover layer 302, a second paint layer 306 directly in contact with the first paint layer 304, and a third paint layer 308 is directly in contact with the second paint layer 306. One of ordinary skill in the art would understand that the whitening process disclosed herein can be applied to golf balls of varying constructions. In one example, whitening of the golf ball occurs due to whitening of the first and second paint layers 304, 306, and not the cover layer 302. In one example, whitening of the golf ball occurs due to whitening of the first, second, and third paint layers 304, 306, 308. In one example, the first, second, and third paint layers 304, 306, 308 are each comprised of white paint. In another example, the first and second paint layers 304, 306 are comprised of white paint and the third paint layer 308 is comprised of a clear coating or clear paint.

In one aspect, the treatment period is at least five hours. In one aspect, the treatment period is no greater than 80 hours. In one aspect, the treatment is 1 hour-24 hours. In one aspect, the treatment period is less than one hour. In another aspect, the treatment period is greater than 80 hours. In one aspect, a maximum value for the treatment period can be based on a time period at which whitening of the golf ball plateaus or levels off, and further exposure to the artificial light treatment can begin damaging the cover of the golf ball or other portions of the golf ball. In one aspect, the present disclosure is directed to a whitening technique of the golf ball, which can be specifically targeted at whitening outer coatings or layers (such as paint layers) of the golf ball as opposed to the golf ball cover.

In one aspect, the treatment period varies depending on the degree of yellowing of the golf ball. In one aspect, the treatment period can increase if more whitening is desired. In one aspect, the treatment period can decrease if less whitening is desired. In one aspect, increasing the irradiance range can reduce the treatment period.

One of ordinary skill in the art would understand based on this disclosure that an optimal range of the treatment period can be determined, particularly based on balancing a whitening effect of the artificial light treatment against potential degradation of the golf ball due to excessive exposure to the artificial light treatment. In particular, prolonged exposure to sunlight, whether natural or artificial, can cause the golf ball to darken in appearance, which can be caused by discoloration of the cover of the golf ball. Accordingly, in one aspect, the present disclosure is particularly suited for golf balls that have experienced discoloration primarily due to intake of biological matter, molecules, chemicals, etc., although one of ordinary skill in the art would appreciate that solar induced discoloration is inevitable for any golf balls exposed to outdoor conditions. In one particular aspect, the whitening treatment disclosed herein is configured to reduce discoloration that has manifested due to intake of biological matter, molecules, chemicals, etc., in at least one paint layer on the cover of the golf ball.

In one specific example, the artificial light treatment comprises a xenon arc lamp. In a particular configuration, one exemplary system configured to provide artificial light is the Q-SUN® series of xenon test chambers from Q-Lab® Corporation. In one aspect, a light filter can be applied to the xenon arc lamp. In one specific example, the artificial light treatment can be supplied via a Q-SUN® xenon test chamber using a Daylight Q filter. In another aspect, Daylight—B/B filters, Daylight-F filters, Extended UV-Q/B filters, Extended UV-Quartz filters, or any other filter from Q-Lab® Corporation can be used. Other exemplary systems can include Type I and/or Type II daylight filter systems. Other exemplary systems can include the Atlas Xenotest Series from AMETEK® Inc. One of ordinary skill in the art would understand that various artificial light treatment systems could be implemented with the presently disclosed whitening process. In yet another aspect, the artificial light treatment does not include a xenon arc lamp, and instead can include a carbon arc lamp, a mercury arc lamp, mercury-xenon arc lamp, and/or other known configurations that are configured to provide artificial light treatments. In some aspects, more than one type of artificial light source can be used to whiten the golf ball. In one aspect, the golf ball can be exposed to incandescent lamps or LEDs. In one aspect, the golf ball can be exposed to a raw (i.e., unfiltered) xenon arc lamp. In some embodiments an intermittent demineralized water spray can be applied to the golf balls during the light treatment.

In one aspect, a wavelength of the artificial light emitted by the artificial light source can at least include 320 nanometers. In one aspect, the wavelength range can be any or all values between 250 nanometers-1,000 nanometers. The wavelength can include at least 340 nanometers in another aspect. The wavelength can include at least 420 nanometers in another aspect. The wavelength range can include at least 170 nanometers-680 nanometers in another aspect. In another aspect, the wavelength can include at least 50 nanometers. The wavelength can include values greater than 1,000 nanometers in another aspect. The wavelength range can include at least 250 nanometers-2,500 nanometers in another aspect. The wavelength range can include at least 100 nanometers-3,500 nanometers in another aspect. Various filters or other techniques can be used to provide a targeted wavelength range. One of ordinary skill in the art would understand that the wavelength range can vary based on the source of the artificial light.

In one aspect, the irradiance range of the artificial light treatment can vary and can generally be configured to mimic natural sunlight, i.e., natural sunlight at sea level. Various exemplary ranges of the irradiance are provided herein, although one of ordinary skill in the art would understand that these values can vary. In one example, the irradiance range can be at least 0.60 $W/m^2/nm$-0.85 $W/m^2/nm$ at 320 nanometers, or 340 nanometers, or 360 nanometers, or 380 nanometers, or 400 nanometers, or 420 nanometers, or 440 nanometers, or 460 nanometers. In another example, the irradiance range can be at least 0.65 $W/m^2/nm$-0.70 $W/m^2/nm$ at 320 nanometers, or 340 nanometers, or 360 nanometers, or 380 nanometers, or 400 nanometers, or 420 nanometers, or 440 nanometers, or 460 nanometers. In another example, the irradiance range can be at least 0.55 $W/m^2/nm$-0.95 $W/m^2/nm$ at 340 nanometers. In another example, the irradiance range can be at least 0.25 $W/m^2/nm$-1.50 $W/m^2/nm$ at 320 nanometers, or 340 nanometers, or 360 nanometers, or 380 nanometers, or 400 nanometers, or 420 nanometers, or 440 nanometers, or 460 nanometers. In another example, the irradiance range can be at least 0.60 $W/m^2/nm$-1.00 $W/m^2/nm$ at 320 nanometers, or 340 nanometers, or 360 nanometers, or 380 nanometers, or 400 nanometers, or 420 nanometers, or 440 nanometers, or 460 nanometers. In another example, the irradiance can be at least 0.35 $W/m^2/nm$ at 340 nanometers. In one example, the irradiance can be at least 0.55 $W/m^2/nm$ at 340 nanometers. In another example, the irradiance can be at least 1.00 $W/m^2/nm$ at 420 nanometers. In yet another example, the irradiance can be exactly 0.68 $W/m^2/nm$ at 340 nanometers. In one example, the irradiance can be at least 0.30 $W/m^2/nm$-1.5 $W/m^2/nm$ at 340 nanometers. In one example, the irradiance can be at least 42 $W/m^2/nm$-125 $W/m^2/nm$ at 300 nanometers-400 nanometers. One of ordinary skill in the art would understand that the irradiance can vary. The irradiance can be a parameter or variable that is fully controlled and adjustable, such as via a controller or setting on an artificial light treatment assembly.

In order to provide a uniform whitening treatment, various configurations can be provided such that the artificial light treatment is configured to be applied to an entire outer surface of the golf ball. For example, the source of the artificial light treatment can be rotated or otherwise moved relative to a stationary golf ball or golf balls. In another example, the golf ball or golf balls can be configured to be rotated or otherwise moved relative to a stationary source of the artificial light treatment. Various movement inducing elements, systems, etc., can be implemented. In one aspect, multiple golf balls can be loaded onto a rotating stage or rack assembly such that the golf balls are continuously rotated in order to ensure a uniform application of the artificial light treatment. In another aspect, a xenon arc lamp or other artificial light emitting component can be continuously rotated or moved relative to a rack or holder of golf balls. One of ordinary skill in the art would further understand that other supports, such as posts, picks, or spindles, can be used to hold the golf balls to maximize the exposure to the artificial light treatment. In one aspect, the artificial light assembly is configured to hold at least 50 golf balls. In one aspect, the artificial light assembly is configured to hold at least 100-1,000 golf balls. One of ordinary skill in the art would understand that various artificial light assemblies can be provided, or can be of varying sizes or capacities such that a large volume of golf balls can be simultaneously whitened.

In one aspect, the artificial light treatment is applied in an enclosed chamber. In this manner, the artificial light treatment is configured to be applied in a controlled manner. The enclosed chamber can be fully shielded from natural light, in one aspect.

In one aspect, the whitening treatment disclosed herein shifts the color of the golf ball closer to the L*a*b* values of the same golf ball out of the box (i.e., new and prior to exposure to use or outdoor conditions). One of ordinary skill in the art would recognize that commercially available golf balls do not all have colors that measure directly at a*=b*=0, and L*=100, which is pure white on the CIELAB color space. In one aspect, the present disclosure provides a whitening process that improves discoloration of a golf ball such that the golf ball appears closer to its original, out of the box color after undergoing the whitening treatment.

In one aspect, the whitening treatment disclosed herein can generally shift the color of the golf ball closer to a*=0, b*=0, and L*=100, which is pure white on the CIELAB color space. In general, the present disclosure improves the color of the golf balls by whitening the golf balls and shifting the golf ball's appearance closer to a*=0, b*=0, and L*=100. In one aspect, the present disclosure reduces discoloration of the golf balls. Accordingly, the ΔE* of the CIELAB color space shows a color shift or change using the presently disclosed whitening treatment. In one aspect, the ΔE* of the CIELAB color space shows a color shift or change towards white in the CIELAB color space when comparing the initial state of the golf ball to the final state of the golf ball.

In one aspect, the golf ball is whitened from an initial state to a final state such that a ΔE* value of the CIELAB color space shows a shift or change by at least 1 unit. In one aspect, the golf ball is whitened from an initial state to a final state such that the ΔE* value of the CIELAB color space shows a shift or change by at least 10 units. In one aspect, the golf ball is whitened from an initial state to a final state such that the ΔE* value of the CIELAB color space shows a shift or change by at least 12 units. In one aspect, the golf ball is whitened from an initial state to a final state such that the ΔE* value of the CIELAB color space shows a shift or change by at least 20 units. In one aspect, the golf ball is whitened from an initial state to a final state such that the ΔE* value of the CIELAB color space shows a shift or change by at least 40 units.

In one aspect, the golf ball is whitened from an initial state to a final state such that an L*-axis value of the CIELAB color space increases by at least 1 unit. In one aspect, the golf ball is whitened from an initial state to a final state such that an L*-axis value of the CIELAB color space increases by at least 1 unit, and more preferably increases by at least 2 units. In another example, the L*-axis value of the CIELAB color space increases by at least 3 units-10 units. In yet another example, the L*-axis value of the CIELAB color space increases by more than 10 units. As used in this context, the term "increase" means that the L*-axis value of the golf ball is shifting towards a value of 100 on the L*-axis scale of the CIELAB color space or the L*-axis value of the golf ball is shifting towards an original L*-axis value for the golf ball straight out of the box and prior to exposure to an outdoor environment. In general, the whitening treatment disclosed herein can improve the overall whiteness of the golf ball, which can correspond to a L*-axis scale of the CIELAB color space that is closer to 100 than originally measured for the golf ball after recovery from a water hazard and prior to the whitening treatment.

The artificial light treatment disclosed herein can generally shift the b*-axis value of the golf ball towards a value of 0 on the b*-axis scale of the CIELAB color space. In one aspect, the golf ball is whitened from an initial state to a final state such that a b*-axis value of the CIELAB color space shifts towards a b*-axis value of 0 (i.e., becomes less yellow) by at least 2 units. In another example, the b*-axis value is changed by the artificial light treatment from a positive b* value to a negative b* value, or from a relatively lower negative b* value to a relatively higher negative b* value. In one aspect, the golf ball is whitened from an initial state to a final state such that a b*-axis value of the CIELAB color space shifts towards a b*-axis value of 0 by at least 6 units. In another example, the b*-axis value of the CIELAB color space shifts towards a b*-axis value of 0 by at least 10 units. In yet another example, the b*-axis value of the CIELAB color space shifts towards a b*-axis value of 0 by more than 10 units. As one of ordinary skill in the art understands, a larger positive b*-axis value on the CIELAB color space means that an object appears to be more yellow. The specific value of the shift in the b*-axis value towards 0 can vary.

The artificial light treatment disclosed herein can generally shift the a*-axis value of the golf ball towards a value of 0 on the a*-axis scale of the CIELAB color space. In one aspect, the golf ball is whitened from an initial state to a final state such that an a*-axis value of the CIELAB color space shifts towards 0 by at least 2 units. In one aspect, the golf ball is whitened from an initial state to a final state such that an a*-axis value of the CIELAB color space shifts towards 0 by at least 5 units. In another example, the a*-axis value of the CIELAB color space shifts towards 0 by at least 10 units. In yet another example, the a*-axis value of the CIELAB color space shifts towards 0 by more than 10 units. The specific value of the shift in the a*-axis value towards 0 can vary.

One of ordinary skill in the art would understand that the whitening of the golf ball can occur based on a relative improvement or shifting of any one or more of the a*-axis, b*-axis, or L*-axis values. In one another example, the golf ball is whitened from an initial state to a final state such that the L*-axis value increases by at least 1 unit, and the a*-axis value and b*-axis value both shift towards 0 on a respective axis by at least 1 unit. In yet another example, the golf ball is whitened from an initial state to a final state such that the L*-axis value increases by 1 unit-5 units, and the a*-axis value and b*-axis value both shift towards 0 on a respective axis by 1 unit-5 units. In yet another example, the golf ball is whitened from an initial state to a final state such that the L*-axis value increases by 5 units-10 units, and the a*-axis value and b*-axis value both shift towards 0 on a respective axis by 1 unit-5 units. In yet another example, the golf ball is whitened from an initial state to a final state such that the L*-axis value increases by 1 unit-10 units, and the a*-axis value and b*-axis value both shift towards 0 on a respective axis by 1 unit-10 units. In yet another example, the golf ball is whitened from an initial state to a final state such that the L*-axis value increases by 5 units-10 units, and the a*-axis value and b*-axis value both shift towards 0 on a respective axis by 5 units-10 units. In yet another example, the golf ball is whitened from an initial state to a final state such that the L*-axis value increases by at least 10 units, and the a*-axis value and b*-axis value both shift towards 0 on a respective axis by at least 5 units. In yet another example, the golf ball is whitened from an initial state to a final state such that the L*-axis value increases by at least 15 units, and the a*-axis value and b*-axis value both shift towards 0 on a respective axis by at least 10 units. In one aspect, the whitening treatment disclosed herein alters the color of the golf ball such that it is closer to the golf ball's original color (i.e., the color of the golf ball immediately after finishing or out of the box).

Prior to applying the artificial light treatment, a debris removal treatment can be applied to the golf ball. The debris removal treatment can be configured to remove visible dirt, debris, biological matter, minerals, etc. This process can include a washing step. This process can use water, or dishwashing soap, laundry detergent, or other soaps, in one example. Wiping, scrubbing, and other physical cleaning steps can be used as a pretreatment of the golf balls prior to the whitening step. In one aspect, jets can spray water, soap or detergent solutions, or other fluids at the golf balls to remove ecological or other matter. In one aspect, this step is a pre-whitening step and is not considered to be a part of the whitening technique.

In one embodiment, the golf balls subjected to the artificial light whitening treatment disclosed herein may be subjected to painting after the whitening treatment. One of ordinary skill in the art would understand that a clearcoat paint can be applied to the outer surface of the golf balls that have undergone the whitening treatment disclosed herein. One of ordinary skill in the art understands that optical brighteners can be incorporated in the clearcoat paint that is applied to the golf balls to further enhance the whitening effect. In one aspect, this step is a post-whitening step and is not considered to be a part of the whitening technique.

Referring to FIG. 1, an exemplary flow diagram is provided for a first configuration 100 configured to whiten golf balls. As shown in FIG. 1, a support 105 is provided that is configured to hold or retain a plurality of golf balls 110'. The golf balls 110' in FIG. 1 can represent golf balls that have been recovered from water hazards. The support 105 is loaded into an artificial light assembly 120 during step **100*a*. One of ordinary skill in the art would understand that the support 105 can be optional. The artificial light assembly 120 is configured to generate artificial light, which can include a full spectrum of light and radiation. The artificial light can be configured to mimic the characteristics of natural sunlight. The artificial light assembly 120 can include a chamber that is configured to be sealed relative to the environment. The artificial light assembly 120 can include a xenon arc lamp assembly, in one example. Various other types of artificial light can be generated by the artificial light assembly 120. In one aspect, the artificial light assembly 120 is configured to generate full spectrum light and radiation. The artificial light assembly 120 can include any of the features or exemplary solutions disclosed herein. After undergoing the artificial light treatment, the whitened golf balls 110 are removed from the artificial light assembly 120. The first configuration 100 can include various additional steps, either before, during, or after step 100***a*.

Figure 2:
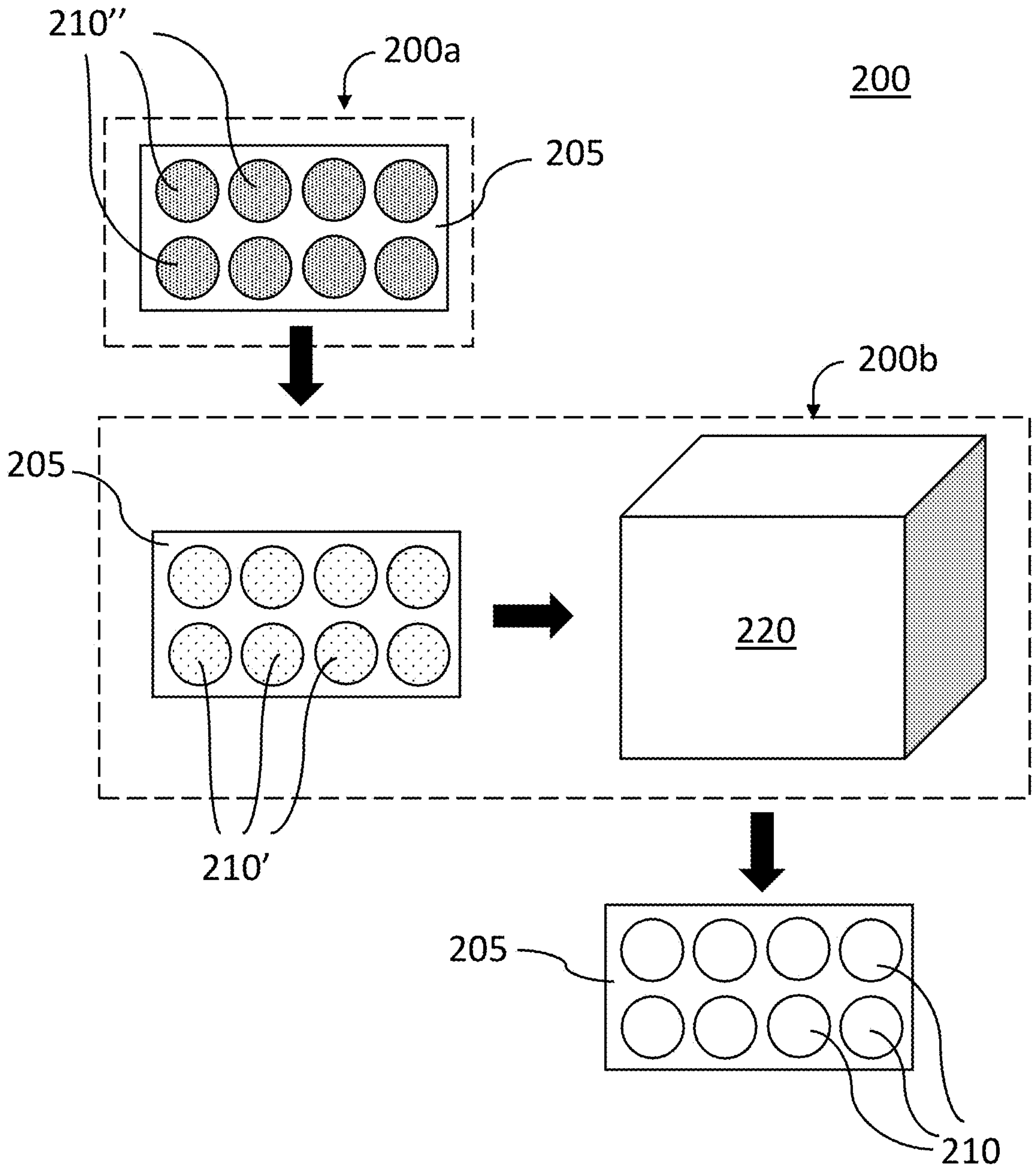
FIG. 2 is an exemplary flow diagram of a whitening configuration according to a second aspect.

In another example shown in FIG. 2, step 200*a* includes a debris-removal treatment prior to the golf balls undergoing the artificial light treatment at step 200*b*. As shown in FIG. 2, the golf balls 210" can undergo a pre-whitening cleaning treatment or process during step 200*a*. During this step, the golf balls 210" can be cleaned, scrubbed, washed, sprayed, or otherwise treated. Step 200*a* can be configured to remove mud, debris, ecological matter, or other material from the surface of the golf balls 210". Step 200*a* can include using mild dishwashing or laundry detergent or soaps.

Step 200*a* can lack any whitening promoting solutions or chemicals, in one aspect. In another aspect, step 200*a* can include applying solutions, mixtures, or other chemicals that are configured to whiten the golf balls 210". In one aspect, step 200*a* can include applying solutions, mixtures, or other chemicals (such as hydrogen peroxide, ammonia, bleach, or other known synthetic or chemical whitening agents) that are configured to react when artificial light is applied, such that a whitening effect can be enhanced based on a synergistic effect between the artificial light whitening treatment (i.e., irradiance or energy based whitening) and the chemical based whitening treatment. One of ordinary skill in the art would understand that the chemical-based treatment can be applied before, simultaneously with, and/or after the artificial light treatment is applied. Step 200*a* can be optional and does not need to be performed. Step 200*b* includes loading the support 205 including the golf balls 210' into the artificial light assembly 220. The whitened golf balls 210 are then removed from the artificial light assembly 220. In one aspect, the artificial light assembly 120, 220 can be a controlled irradiance xenon arc lamp assembly and chamber. The irradiance can be dynamically controlled to provide a constant irradiance.

The method of whitening a golf ball recovered from a water hazard can comprise applying an artificial light treatment to the golf ball at a wavelength range and an irradiance range for a treatment period such that the golf ball is whitened. The wavelength range can include at least 250 nanometers-2,500 nanometers. The irradiance range can be at least 0.60 $W/m^2/nm$-1.20 $W/m^2/nm$, or at least 0.68 $W/m^2/nm$-1.10 $W/m^2/nm$, or at least 0.68 $W/m^2/nm$-1.50 $W/m^2/nm$, or at least 1.50 $W/m^2/nm$-2.40 $W/m^2/nm$ at 320 nanometers, or 340 nanometers, or 360 nanometers, or 380 nanometers, or 400 nanometers, or 420 nanometers. The treatment period can be at least one hour and no greater than 80 hours. The golf ball can have a cover formed from ionomer, polyurethane, polyurea, or hybrid of polyurethane-polyurea. The golf ball can be whitened from an initial state to a final state, such that a ΔE* value of the CIELAB color space shows a color shift of change of at least 2 units.

Another method of whitening a golf ball recovered from a water hazard is also disclosed. The method comprises removing debris from the golf ball, and applying an artificial light treatment to the golf ball at a wavelength range and an irradiance for a treatment period such that the golf ball is whitened. The artificial light treatment comprises a xenon arc lamp, in one aspect. The wavelength range can include at least 250 nanometers-2,500 nanometers. The irradiance can be 0.68 $W/m^2/nm$ at 340 nanometers. The treatment period can be at least one hour. The golf ball can be whitened from an initial state to a final state, such that a ΔE* value of the CIELAB color space shifts by at least 2 units.

In one example, the artificial light assembly can include an accelerated weather testing apparatus or assembly. The artificial light assembly can be configured to replicate natural sunlight, and/or exposure to external weather conditions, such as heat, humidity, moisture, etc. In one aspect, the artificial light assembly is held at a temperature range of 40° F.-85° F. In one aspect, the artificial light assembly is held at a temperature range of 55° F.-75° F. In one aspect, the artificial light assembly is held at a temperature range of 65° F.-70° F. In one aspect, the artificial light assembly is held at a temperature range of less than 120° F. In one aspect, the temperature range can be 50° F.-250° F.

In one aspect, the artificial light assembly is held at a humidity of at least 60%. In one aspect, the artificial light assembly is held at a humidity of at least 75%. In one aspect, the artificial light assembly is held at a humidity of at least 85%. In one aspect, the humidity is 20%-95%. The temperature and humidity ranges for the artificial light assembly can vary.

In one example, the present whitening method and system does not require any chemical based whitening agents, solutions, or features. Instead, the whitening process can be achieved solely based on the artificial light treatment, i.e., an irradiance or energy based whitening treatment. FIG. 1 illustrates one exemplary configuration for this arrangement which does not require any synthetic chemical based whitening solutions or substances, such as applying synthetic whitening fluids or chemicals to an outer surface of the golf ball. In one aspect, no chemical fluids are required to be applied to the golf ball in order to whiten the appearance of the golf ball. Accordingly, the present disclosure provides a reliable, environmentally friendly, and consistent whitening process for golf balls that also does not require any structural alterations to the golf ball or golf ball cover. The present disclosure eliminates the need to dispose of used synthetic chemical whitening agents or fluids, in one aspect. In one aspect, the whitening treatment disclosed herein can be considered an energy based or irradiance based whitening process as opposed to a fluid or chemical based whitening process.

In one example, the golf balls are sprayed with a liquid intermittently during the artificial light treatment. The golf balls can be sprayed with water, in one specific example. In some aspects, the golf balls can be continuously sprayed or the golf balls can sprayed at a predetermined interval.

In one aspect, the artificial light treatment can be based on with ASTM G155 "Standard Practice for Operating Xenon Arc Lamp Apparatus for Exposure of Materials" and/or ASTM G90 "Standard Practice for Performing Accelerated Outdoor Weathering of Materials Using Concentrated Natural Sunlight," and/or ASTM G151 "Standard Practice for Exposing Nonmetallic Materials in Accelerated Test Devices that Use Laboratory Light Sources."

In one aspect, the golf balls suitable for the whitening treatment described herein can be the Titleist® Pro VIR, and the Titleist® Pro V1x®. In other aspects, the golf balls suitable for the whitening treatment described herein can be the Titleist® AVX, Tour Speed, Tour Soft, Velocity, TruFeel, or any other commercially available golf ball. One of ordinary skill in the art would understand that the present whitening treatment can be used for other suitable golf balls.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure.

The golf ball whitening system and method described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. Any section headings herein are provided only for consistency with the suggestions of 37 C.F.R. § 1.77 or otherwise to provide organizational queues. These headings shall not limit or characterize the feature(s) set forth herein.

What is claimed is:

1. A method of whitening a used golf ball, the method comprising:

applying an artificial light treatment to the golf ball at an irradiance range for a treatment period such that the golf ball is whitened.

2. The method according to claim 1, wherein the golf ball has been recovered from being at least partially submerged in a water hazard.

3. The method according to claim 1, wherein the golf ball has a cover formed from ionomer, polyurethane, polyurea, or a hybrid of polyurethane-polyurea.

4. The method according to claim 3, wherein the golf ball comprises at least one paint layer disposed on the cover.

5. The method according to claim 1, wherein the treatment period is at least one hour and no greater than 80 hours.

6. The method according to claim 1, wherein the artificial light treatment comprises at least one of: a xenon arc lamp, a carbon arc lamp, a mercury arc lamp, a mercury-xenon arc lamp, an incandescent lamp, or a light emitting diode (LED).

7. The method according to claim 1, wherein the artificial light treatment comprises a xenon arc lamp.

8. The method according to claim 7, wherein a light filter is applied to the xenon arc lamp.

9. The method according to claim 1, wherein the artificial light treatment is configured to emit light within a wavelength range that includes at least a subset of wavelengths between 300 nanometers-2,500 nanometers.

10. The method according to claim 1, wherein the artificial light treatment is applied in an enclosed chamber.

11. The method according to claim 1, wherein the golf ball is whitened from an initial state to a final state, such that an L*-axis value of the CIELAB color space increases by at least 1 unit.

12. The method according to claim 1, wherein the golf ball is whitened from an initial state to a final state, such that a b*-axis value of the CIELAB color space shifts closer to a b*-axis value of 0 by at least 1 unit.

13. The method according to claim 1, wherein the golf ball is whitened from an initial state to a final state such that a ΔE* value of the CIELAB color space shows a color shift of at least 2 units.

14. The method according to claim 1, wherein the irradiance range is at least 0.68 $W/m^2/nm$-1.10 $W/m^2/nm$ at 340 nanometers.

15. The method according to claim 1, wherein the method lacks any synthetic whitening fluids.

16. A method of whitening a used golf ball recovered from a water hazard, the method comprising:

applying an artificial light treatment to the golf ball at an irradiance range for a treatment period such that the golf ball is whitened, wherein the irradiance range is at least 0.50 $W/m^2/nm$ at 340 nanometers, and the treatment period is at least one hour and no greater than 80 hours;

wherein the golf ball has a cover formed from ionomer, polyurethane, polyurea, or hybrid of polyurethane-polyurea; and the golf ball is whitened from an initial state to a final state, such that a ΔE* value of the CIELAB color space shows a color shift of at least 2 units.

17. The method according to claim 16, wherein the artificial light treatment comprises a xenon arc lamp, and the method lacks any synthetic whitening fluids.

18. A method of whitening a used golf ball recovered from a water hazard, the method comprising:

applying an artificial light treatment to the golf ball at an irradiance for a treatment period such that the golf ball is whitened, wherein the artificial light treatment comprises a xenon arc lamp, wherein the irradiance is at least 0.68 $W/m^2/nm$-1.10 $W/m^2/nm$ at 340 nanometers, and the treatment period is at least one hour; and the golf ball is whitened from an initial state to a final state, such that a ΔE* value of the CIELAB color space shows a color shift of at least 2 units.

* * * * *